United States Patent [19]

Booth et al.

[11] Patent Number: 4,685,202

[45] Date of Patent: Aug. 11, 1987

[54] METHOD OF FORMING A COUPLING DISC FOR AN ELECTROMAGNETIC COUPLING

[75] Inventors: Dwight E. Booth, Janesville; Michael L. Cory, Beloit, both of Wis.

[73] Assignee: Dana Corporation, Toledo, Ohio

[21] Appl. No.: 818,217

[22] Filed: Jan. 13, 1986

[51] Int. Cl.$^4$ ............................................. H01F 41/02
[52] U.S. Cl. .............................. 29/607; 219/121 LD;
  219/121 LN; 219/121 LM; 188/161; 192/84 PM; 228/168
[58] Field of Search ...................... 29/602 R, 416, 607;
  228/168, 169, 165, 166; 219/121 LC, 121 LD,
  121 LG, 121 LN, 121 LM, 121 ED, 121 EK, 12
  EM; 188/161–164, 251 M, 218 XL; 192/84 A,
  84 B, 84 C, 84 D, 84 PM, 12 D, 17 C, 18 B

[56] References Cited
U.S. PATENT DOCUMENTS

| | | | |
|---|---|---|---|
| 3,332,145 | 7/1967 | Klinkenberg | 29/607 |
| 4,104,589 | 8/1978 | Baker et al. | 29 X/416 X |
| 4,187,939 | 2/1980 | Silvestrini et al. | 192/84 C |
| 4,203,021 | 5/1980 | Anderl et al. | 219/121 EB |

*Primary Examiner*—Carl E. Hall
*Attorney, Agent, or Firm*—Leydig, Voit & Mayer

[57] ABSTRACT

A method of forming non-magnetic barriers in the coupling disc (e.g., the armature or rotor) of an electromagnetic coupling such as a clutch or brake. The method is carried out by moving the disc relative to a laser beam which cuts a slot through the disc. In one embodiment, the slot is filled throughout its entire length by non-magnetic material, the filling being effected by continuously advancing a non-magnetic wire toward the laser beam to cause the wire to be melted by the beam and to flow into the newly formed slot. In another embodiment, the wire is advanced intermittently to form short non-magnetic bridges beween relatively long slots.

15 Claims, 5 Drawing Figures

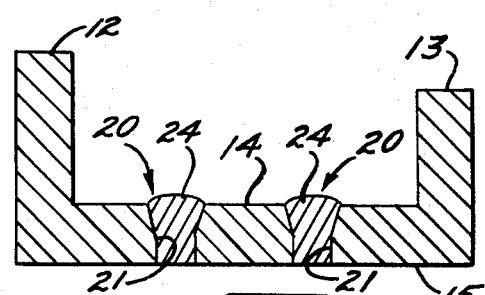
Fig. 1.
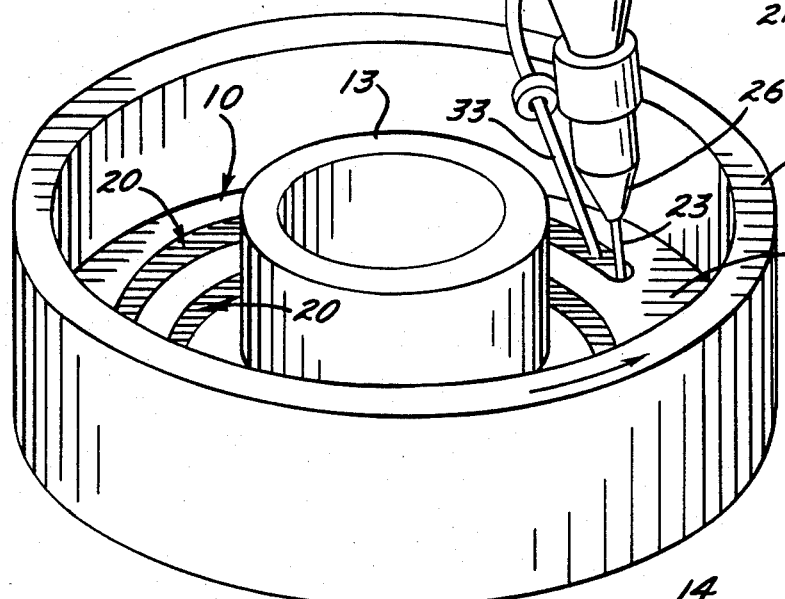
Fig. 4.
Fig. 2.
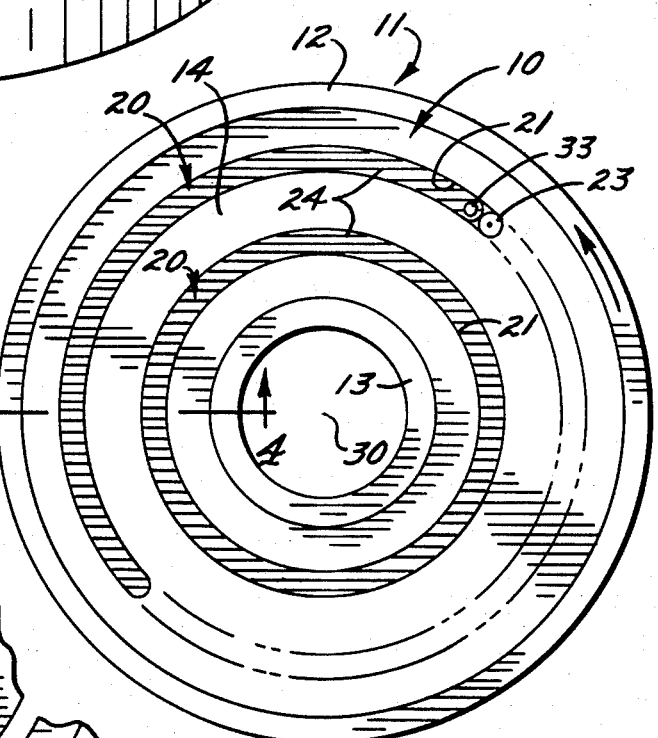
Fig. 3.
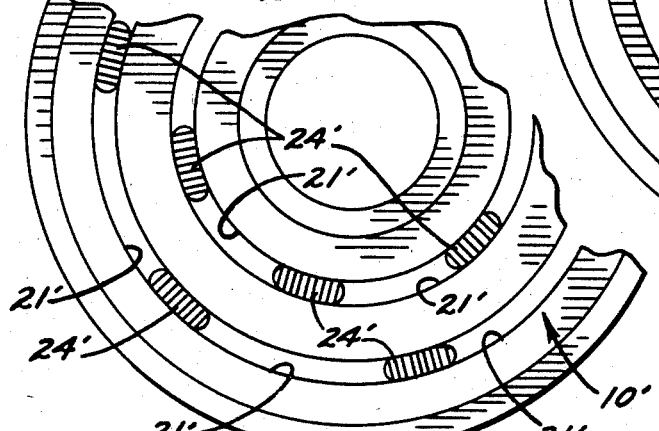
Fig. 5.

METHOD OF FORMING A COUPLING DISC FOR AN ELECTROMAGNETIC COUPLING

BACKGROUND OF THE INVENTION

This invention relates to a method for forming a multiple pole coupling disc of the type used in an electromagnetic coupling such as an electromagnetic clutch or brake. The coupling disc may be part of a rotary or non-rotary field or may be a rotary or non-rotary armature.

A typical electromagnetic coupling is disclosed in Silvestrini et al U.S. Pat. No. 4,187,939 and, in that particular case, the coupling is an electromagnetic clutch having a rotary armature disc made of magnetic material such as steel and having a field with a rotary coupling disc or rotor which also is made of magnetic material. When the coil of the field is excited, magnetic flux threads a path between the rotor and the axially opposing armature and attracts the armature into engagement with the rotor to couple the two for rotation in unison.

In the coupling disclosed in the Silvestrini et al patent, the armature is formed with a ring of angularly spaced "banana" slots while the rotor is formed with two concentric rings of angularly spaced banana slots located on opposite sides of the ring of slots in the armature. The banana slots form high reluctance air gaps causing the rotor and armature to define four magnetic poles which increase the torque of the coupling. By forming an additional ring of slots in each of the rotor and armature, the coupling may be constructed as a six-pole coupling with even higher torque capacity.

The banana slots conventionally are stamped in the rotor and armature. Presently available stamping techniques dictate that, as a general rule, the radial width of the slots must be at least as great as the thickness of the disc. As a result, difficulty is encountered in stamping multiple rings of slots in a comparatively thick disc which is relatively small in diameter. In addition, adjacent banana slots are separated by magnetic webs or bridges which inherently form low reluctance flux leakage paths extending radially between the poles.

As an alternative to slotting the rotor and armature to form high reluctance air gaps, channels may be machined in the disc and then filled with non-magnetic material to define high reluctance barriers between the poles. Subsequently, the disc is machined to remove the bottoms of the magnetic channels and eliminate the flux leakage paths which otherwise would be created across the bottoms of the channels. This manufacturing process is relatively expensive and becomes even more so when each disc is formed with two or more high reluctance rings.

SUMMARY OF THE INVENTION

The general aim of the present invention is to provide a new and improved method which enables non-magnetic barriers of comparatively narrow width to be formed in a magnetic coupling disc in a relatively quick manner and without creating angularly spaced low reluctance areas in the barriers.

A more detailed object of the invention is to achieve the foregoing by using a laser beam to cut a very narrow slot through the disc and by filling at least portions of the slot with non-magnetic material. In the preferred method, the non-magnetic material is melted by the same laser beam which cuts the slot and flows into and becomes welded within the slot immediately after the slot is formed.

The invention also resides in the method of using the laser beam and the non-magnetic filler to form a completely filled non-magnetic ring in the magnetic disc or to form the magnetic disc with a ring of angularly spaced banana slots separated by non-magnetic webs.

These and other objects and advantages of the invention will become more apparent from the following detailed description when taken in conjunction with the accompanying drawings.

BRIEF DESCRIPTION OF THE DRAWINGS

FIG. 1 is a perspective view showing one type of a coupling disc being slotted and filled by the new and improved method of the present invention.

FIG. 2 is a fragmentary perspective view showing portions of the coupling disc, the laser and the filler material.

FIG. 3 is a plan view which schematically shows the coupling disc being slotted and filled.

FIG. 4 is an enlarged fragmentary cross-section taken substantially along the line 4—4 of FIG. 3.

FIG. 5 is a top plan view of a different coupling disc formed by another version of the method of the present invention.

DETAILED DESCRIPTION

The drawings illustrate the method of the present invention as being used for forming a coupling disc 10 for use in an electromagnetic coupling such as an electromagnetic brake or clutch. While the disc could be an armature, it herein is shown as forming part of a clutch rotor 11 which may, for example, be of the type disclosed in the aforementioned Silvestrini et al patent. In this particular instance, the rotor is circular in shape and includes an outer shell 12 and an inner hub 13 which preferably are integral with one face 14 (FIG. 2) of the disc 10. The opposite face 15 of the disc forms the working face of the rotor 11 and is adapted to frictionally engage the armature (not shown) of the clutch. As is conventional, the rotor is made of low reluctance magnetic material such as AISI 1010 steel.

The specific rotor 11 which has been illustrated forms part of a four-pole clutch and thus the disc 10 includes inner and outer concentric barriers or rings 20 which are non-magnetic. One magnetic pole is defined by that area of the disc located inside of the inner ring, two poles are defined by the area between the rings, and the fourth pole is defined by the area located outwardly of the outer ring. By providing the disc 10 with a third non-magnetic ring (not shown), the rotor 11 may form part of a six-pole clutch.

In accordance with the present invention, the non-magnetic rings 20 are formed by cutting slots 21 in the disc with a laser beam 23 and by filling at least portions of each slot with non-magnetic material 24. As a result of cutting the slots 21 with the laser beam 23, each slot may be made very narrow in radial width so as to enable a multiplicity of concentric slots to be formed economically in a relatively thick disc 10 of relatively small diameter. Moreover, the heat energy of the laser beam preferably also is used to melt the non-magnetic material 24 and to cause the material to flow into and fill the slots 21.

FIGS. 1 and 3 show the inner slot 21 of the disc 10 as having already been formed and filled and schematically show the preferred method of forming and filling the outer slot. The laser beam 23 is directed downwardly against the face 14 of the disc by a focusing tip 26 located at the lower end of a laser head 27. The disc 10 and the laser head 27 are adapted to be rotated relative to one another through 360 degrees about an axis coinciding with the center 30 of the disc and, in this particular instance, the relative rotation is effected by keeping the laser head fixed in space and by rotating the rotor 11 about its own axis. It will be understood, of course, that the rotor could be held in a fixed position and that the laser head could be traversed in a circular path about the axis of the rotor.

The laser beam 23 is of very small diameter, the diameter of the beam herein being on the order of 0.015" to 0.020". As the rotor 11 turns relative to the small-diameter beam, the latter cuts a very narrow slot 21 completely through the disc 10. With a disc having a thickness of about ¼", the slot has a width of approximately 0.150" at the face 14 of the disc and a width of about 0.040" at the face 15 of the disc. In forming the embodiment illustrated in FIGS. 1 to 4, the laser beam 23 is directed continuously against the disc while the rotor is turned through a full 360 degrees and thus an uninterrupted circular slot 21 is formed completely around the disc.

The preferred method of filling the slot 21 with non-magnetic material 24 involves the use of an elongated rod or wire 33 of non-magnetic material located in closely spaced and angularly fixed relation with the laser beam 23. In this particular instance, the wire 33 is disposed in leading relationship to the laser with respect to the direction of rotation of the disc 10. As the disc rotates, the wire is advanced lengthwise toward the beam. The heat generated by the beam causes the wire to melt and flow into the newly cut slot 21 and then become welded to the edges thereof. When forming the rotor shown in FIGS. 1 to 4, the wire is advanced continuously during rotation of the disc and thus the entire slot is filled with non-magnetic material. The preferred magnetic material is a stainless steel consisting of about 80 percent nickel and 20 percent chromium but any suitable non-magnetic metal such as brass or aluminum may be used in place of the stainless steel.

As illustrated in FIG. 2, the laser beam 23 is directed against the rear or non-working face 14 of the disc 10 rather than against the face 15 which forms the working or friction face of the disc. At the surface where the beam first impinges against the disc, the width of the slot 21 cannot be precisely controlled and thus may vary somewhat along the circumference of the slot. As the beam penetrates into the disc, however, the slot first tapers and then tends to assume a constant width (see FIG. 4). Accordingly, a slot of substantially uniform width may be formed at the working face 15 by directing the beam against the non-working face 14. When filling the slot, non-magnetic material 24 may be deposited throughout the entire depth of the slot as specifically shown in FIG. 4 or, alternatively, the slot may be only partially filled such that the non-magnetic material terminates short of the face 14.

The disc 10 of FIGS. 1 to 4 is relatively high in strength since its slots 21 are completely filled with non-magnetic material. If low weight should happen to be a more important consideration than high strength, a disc 10' may be formed as shown in FIG. 5. In that instance, the laser beam 23 is directed continuously at the disc as before during the full 360 degree rotation of the disc but the non-magnetic wire 23 is advanced toward the beam only at short intermittent intervals. As a result, the disc is formed with relatively long and arcuate unfilled "banana" slots 21' which are connected to one another by relatively short bridges or webs 24' of non-magnetic material. The webs 24' fill short portions of the circular slot during the short periods when the wire is fed while the remaining longer portions of the slot are left unfilled. The disc 10' thus has the same light weight as a disc with conventionally formed banana slots but the webs 24' are made of non-magnetic material rather than magnetic material so as to reduce flux leakage between the poles.

From the foregoing, it will be apparent that the present invention brings to the art a new and improved method which enables an electromagnetic coupling disc to be formed with very narrow slots so that a disc which is relatively small in diameter may be formed with multiple magnetic poles even though the disc is comparatively thick. The combined laser cutting and filling operation enables the disc to be slotted quickly and easily and reduces the number and complexity of machining operations required by manufacturing methods which presently are in use for coupling discs. Those familiar with the art will appreciate that the present method may be used to form a coupling disc having slots which differ in shape from those specifically shown in the drawings.

We claim:

1. A method of forming a multiple pole coupling disc for an electromagnetic coupling, said method comprising the steps of, providing a disc made of magnetic material, directing a laser beam toward one face of said disc at a location between the center of the disc and the outer periphery thereof, effecting relative turning between said disc and said laser beam to cause said laser beam to heat said disc and form curved slot means in the disc, and filling at least selected portions of said slot means with molten non-magnetic material different from the magnetic material of said disc and capable of welding to the edges of said slot means.

2. A method as defined in claim 1 in which an elongated rod of said non-magnetic material is located in closely spaced relation with said laser beam, said method further comprising the step of advancing said rod lengthwise toward said laser beam and said slot means during said relative turning thereby to cause said rod to be melted by said laser beam and to cause said non-magnetic material to flow into and fill said portions of said slot means immediately after formation of said slot means.

3. A method as defined in claim 2 in which said laser beam and said disc are relatively rotated through substantially 360 degrees about an axis coinciding with the center of the disc and in which said laser beam is directed continuously at said disc during substantially the entire relative rotation whereby said laser beam forms a substantially circular slot around said disc.

4. A method as defined in claim 3 in which said rod is advanced substantially continuously during substantially the entire relative rotation whereby substantially the entire slot is filled with said non-magnetic material.

5. A method as defined in claim 3 in which said rod is advanced intermittently during said relative rotation whereby only angularly spaced arcuate portions of said slot are filled with said non-magnetic material.

6. A method as defined in claim 5 in which the intermittent advance of said rod is timed such that the angularly spaced filled portions of said slot are substantially shorter in arcuate length than the angularly spaced unfilled portions of said slot.

7. A method of forming a multiple pole coupling disc for an electromagnetic coupling, said method comprising the steps of, providing a generally circular disc made of magnetic material, directing a laser beam continuously toward one face of said disc at a location between the center of the disc and the outer periphery thereof, effecting relative rotation between said disc and said laser beam through a full 360 degrees about an axis coinciding with the center of the disc to cause said laser beam to heat said disc and to form a circular slot completely around and through the disc, providing an elongated rod of non-magnetic material in closely spaced and angularly fixed relation with said laser beam, and continuously advancing said rod lengthwise toward said slot during said relative rotation thereby to cause melting of said non-magnetic material by said laser beam and to cause said non-magnetic material to flow into and fill said slot and to become welded to the heated edges thereof.

8. A method as defined in claim 7 in which said laser beam is directed toward the face of the coupling disc opposite the face which defines the coupling face of the disc.

9. A method of forming a multiple pole coupling disc for an electromagnetic coupling, said method comprising the steps of, providing a generally circular disc made of magnetic material, directing a laser beam continuously toward one face of said disc at a location between the center of the disc and the outer periphery thereof, effecting relative rotation between said disc and said laser through a full 360 degrees about an axis coinciding with the center of the disc to cause said laser beam to heat said disc and to form a circular slot completely around and through the disc, providing an elongated rod of non-magnetic material in closely spaced and angularly fixed relation with said laser beam, and intermittently advancing said rod lengthwise toward said slot during said relative rotation thereby to cause melting of said non-magnetic material by said laser beam and to cause said non-magnetic material to flow into and fill angularly spaced arcuate portions of said slot and to become welded to the heated edges thereof.

10. A method as defined in claim 9 in which the intermittent advance of said rod is timed such that the angularly spaced filled portions of said slot are substantially shorter in arcuate length than the angularly spaced unfilled portions of said slot.

11. A method of forming a multiple pole coupling disc for an electromagnetic coupling having a coacting coupling member adapted to selectively engage the coupling disc, said method comprising the steps of, providing a disc made of magnetic material, said disc having a working face for engaging said coupling member and having an opposite non-working face, directing a laser beam toward the non-working face of said disc at a location between the center of the disc and the outer periphery thereof, effecting relative movement between said disc and said laser beam to cause said laser beam to heat said disc and form slot means in the disc, and filling at least selected portions of said slot means with molten non-magnetic material capable of welding to the edges of said slot means.

12. A method as defined in claim 11 in which said relative movement is effected by turning said disc relative to said laser beam.

13. A method of forming a multiple pole coupling disc for an electromagnetic coupling, said method comprising the steps of, providing a generally circular disc made of magnetic material, directing a laser beam continuously toward one face of said disc at a location between the center of the disc and the outer periphery thereof, effecting relative turning between said disc and said laser beam to cause said laser beam to heat said disc and to form a curved slot completely through the disc, providing an elongated rod of non-magnetic material in closely spaced and angularly fixed relation with said laser beam, and continuously advancing said rod lengthwise toward said slot during said relative turning thereby to cause melting of said non-magnetic material by said laser beam and to cause said non-magnetic material to flow into and fill said slot and to become welded to the heated edges thereof.

14. A method of forming a multiple pole coupling disc for an electromagnetic coupling, said method comprising the steps of, providing a generally circular disc made of magnetic material, directing a laser beam continuously toward one face of said disc at a location between the center of the disc and the outer periphery thereof, effecting relative turning between said disc and said laser to cause said laser beam to heat said disc and to form a curved slot completely through the disc, providing an elongated rod of non-magnetic material in closely spaced and angularly fixed relation with said laser beam, and intermittently advancing said rod lengthwise toward said slot during said relative turning thereby to cause melting of said non-magnetic material by said laser beam and to cause said non-magnetic material to flow into and fill angularly spaced curved portions of said slot and to become welded to the heated edges thereof.

15. A method as defined in claim 14 in which the intermittent advance of said rod is timed such that the angularly spaced filled portions of said slot are substantially shorter in arcuate length than the angularly spaced unfilled portions of said slot.

* * * * *